No. 616,837. Patented Dec. 27, 1898.
J. A. GREGORY.
CULTIVATOR.
(Application filed Feb. 21, 1898.)

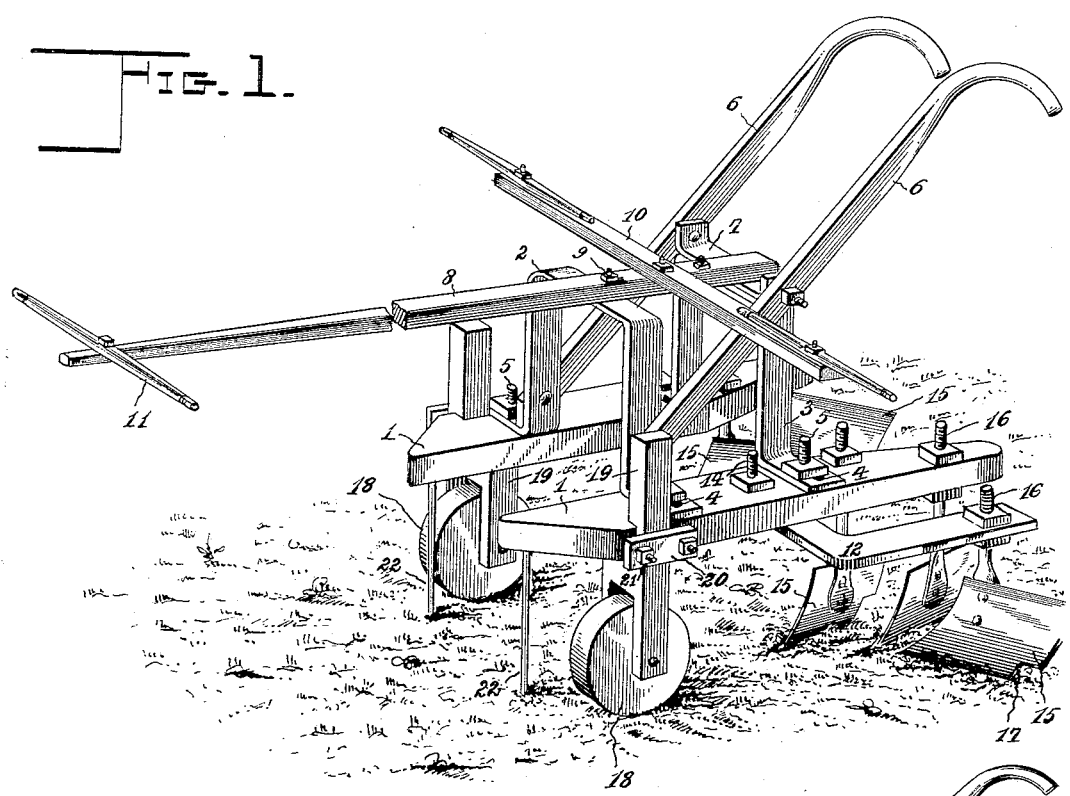

(No Model.) 2 Sheets—Sheet 2.

Witnesses
John F. Seufferwied
V. B. Hillyard.

James A. Gregory, Inventor
By his Attorneys,
C. A. Snow & Co.

UNITED STATES PATENT OFFICE.

JAMES A. GREGORY, OF WOODVILLE, NORTH CAROLINA.

CULTIVATOR.

SPECIFICATION forming part of Letters Patent No. 616,837, dated December 27, 1898.

Application filed February 21, 1898. Serial No. 671,186. (No model.)

*To all whom it may concern:*

Be it known that I, JAMES A. GREGORY, a citizen of the United States, residing at Woodville, in the county of Perquimans and State of North Carolina, have invented a new and useful Cultivator, of which the following is a specification.

This invention has relation to agricultural implements for tilling the soil and cultivating the plants, and is designed, primarily, to provide a cultivator which is adjustable to be readily adapted to the different kinds of work and soil, so as to secure the best results possible.

The implement in its general construction comprises longitudinal beams bearing earth-treating devices, front and rear arches having the beams adjustably connected therewith, whereby the distance between them can be varied, a pole or tongue having loose connection with the horizontal portions of the arches to enable the implement to be properly directed in its travel over the field, so as to obviate injury to the plants, and approximately L-shaped beams having adjustable connections with the longitudinal beams and projecting laterally therefrom and bearing plows or shovels to coöperate with corresponding plows or shovels applied to the rear portion of the main beams.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 3:
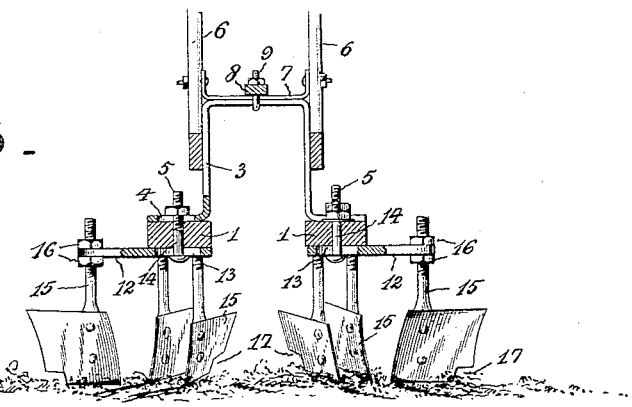
Figure 4:
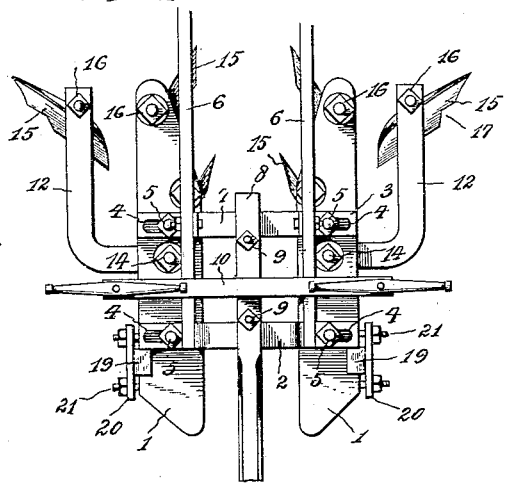
Figure 5:
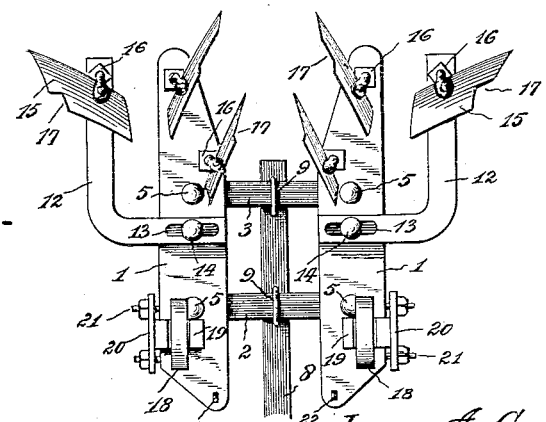

Figure 1 is a perspective view of the cultivator. Fig. 2 is a longitudinal section. Fig. 3 is a transverse section, parts being broken away, showing the slots in the horizontal portions of the rear arch and in the lateral arms of the L-shaped beams. Fig. 4 is a top plan view. Fig. 5 is a bottom plan view.

Corresponding and like parts are referred to in the following description and indicated in the views of the drawings by the same reference characters.

The longitudinal beams 1 are of similar construction and are disposed in parallel relation and spaced apart the requisite distance. Front and rear arches 2 and 3, respectively, adjustably connect the longitudinal beams 1 and have their horizontal end portions longitudinally slotted, as shown at 4, to receive the bolts 5, by means of which the beams 1 have adjustable connection therewith, so as to be moved farther apart or closer together. The handles 6 are connected at their lower front ends with the vertical portions of the front parts 2, near their lower ends, and are connected a short distance from their front ends by means of a transverse bar 7, which has its end portion bent vertically and secured in any substantial manner to the handles. This bar 7 rests upon the upper horizontal portion of the rear arch 3, and is held thereto against vertical displacement by means of the rear fastening between the arch 3 and the rear portion of the pole or tongue 8.

The pole or tongue 8 rests upon the upper horizontal portion of the front and rear arches and has loose connection therewith, so as to move laterally. Any fastenings which will admit of the lateral movement of the pole or tongue may be employed for connecting it with the arches, and, as shown, hooked bolts 9 are resorted to, the threaded shanks passing through openings in the pole or tongue and the hooked ends engaging with the upper horizontal portion of the arches. The pole or tongue is provided with a doubletree 10, having singletrees at its ends, and with a neck-yoke 11 at its front end, these parts being of ordinary construction and adapted to have the team hitched thereto.

Beams 12 of approximately L form have adjustable connection with the longitudinal beams 1, so as to be moved in or out or turned to secure any angular adjustment. The lateral arms of the L-beams 12 have longitudinal slots 13, which receive bolts or like fastenings 14, by means of which the said beams 12 are secured in an adjusted position. The longitudinal arms of the L-beams extend rearwardly, about parallel with the beams 1, and are provided at their rear ends with shovels or plow-points 15, the shanks of which are threaded and are vertically adjustable, being secured in an adjusted position by pairs of clamp-nuts 16, disposed upon opposite sides of the beam and adapted to be turned up, so as to bind against the upper and lower faces thereof and secure the shovel or plow-point in the desired position. Upon loosening the bolts or fastenings 14 the L-beams 12 may be moved in or out or turned so as to position the shovel or plow-point carried thereby with reference to the corresponding shovels or plow-points applied to the longitudinal beams 1. Other shovels or plow-points 15 are applied to the rear portion of the longitudinal beams 1 in a manner similar to the shovel or plow-point applied to either of the L-beams, thereby admitting of the said shovels being adjusted vertically or to any desired angle with reference to the line of draft. The lower rear corners of the shovels or plow-points are cut away, as shown at 17, to prevent injury to the plants in the event of the shovels running too close to the roots thereof. The inner forward shovels or blades applied to the beams 1 may be scrapers or have any desired form to meet any requirement of the work in hand or to suit the desire of the attendant.

Gage-wheels 18 have adjustable connection with the front ends of the beams 1 and are journaled in the lower bifurcated ends of standards 19, the latter entering notches in the outer edges of the beams 1 and being secured therein in an adjusted position by plates 20 and bolts or like fastenings 21, said fastenings passing through end portions of the plates 20 upon opposite sides of the standards 19, so as to securely and firmly hold these standards in the located position after the bolts have been screwed home. These gage-wheels run upon the ground and determine the depth of cultivation, and by moving them up or down the plow-points or shovels are enabled to penetrate the soil to a greater or less depth, as may be required. Teeth 22 are applied to the front ends of the beams 1 and loosen the soil in advance of the plow-points or cultivating-shovels and serve to break up any clods which may be in the path of the implement.

The implement is drawn over the field by the team hitched to the pole or tongue 8 in the ordinary manner, and by reason of the loose connection between the pole or tongue and the implement the latter can be shifted laterally by the operator, so as to avoid injury to the plants to be cultivated. The shovels or plow-points can be turned to any angle, with reference to the line of draft, so as to throw a greater or less quantity of earth toward the plants, as will be readily understood.

Having thus described the invention, what is claimed, and desired to be secured by Letters Patent, is—

1. In an agricultural implement, the combination of longitudinal beams bearing earth-treating devices and substantially L-shaped beams having their lateral arms adjustably connected with the longitudinal beams, and having their longitudinal arms extending rearwardly about parallel with the longitudinal beams and bearing earth-treating devices to act jointly with the corresponding parts of the longitudinal beams, substantially as and for the purpose set forth.

2. In an agricultural implement, the combination of longitudinal beams bearing earth-treating devices, L-beams having the inner ends of their lateral arms longitudinally slotted and having their longitudinal arms extending rearwardly and about parallel with the longitudinal beams and provided with corresponding earth-treating devices, and fastenings passing through the slotted ends of the L-beams and connecting the latter with the longitudinal beams, the L-beams being movable in or out and adapted to be turned upon their fastenings with the said longitudinal beams, substantially as set forth.

3. In combination, longitudinal beams bearing earth-treating devices, front and rear arches connecting the longitudinal beams, and a pole or tongue resting upon the upper horizontal portions of the arches, and having loose connection therewith, substantially as set forth.

4. In combination, longitudinal beams bearing earth-treating devices, front and rear arches connecting the said beams, handles having their lower front ends connected with the vertical members of the front arch, a transverse bar connecting the handles a short distance from their front ends and resting upon the upper horizontal portion of the rear arch, a pole or tongue resting upon the front arch and the transverse bar connecting the handles, and means for positively and loosely connecting the pole or tongue with the upper horizontal portions of the arches, substantially as set forth.

5. In combination, longitudinal beams, front and rear arches adjustably connecting the beams, gage-wheels having adjustable connection with the front ends of the longitudinal beams, L-beams having adjustable connection with the longitudinal beams, and plow-points or shovels having their shanks adjustably connected with the respective beams so as to admit of vertical or angular adjustment, substantially as and for the purpose set forth.

JAMES A. GREGORY.

Witnesses:
J. Q. A. WOOD,
C. CALEB LILLY.